United States Patent
Sakuma

(10) Patent No.: US 6,794,448 B2
(45) Date of Patent: Sep. 21, 2004

(54) RESIN PARTICLES AND PROCESS FOR PRODUCING THE SAME

(75) Inventor: Itaru Sakuma, Shiga (JP)

(73) Assignee: Sekisui Plastics Co., Ltd., Osaka (JP)

(*) Notice: Subject to any disclaimer, the term of this patent is extended or adjusted under 35 U.S.C. 154(b) by 1 day.

(21) Appl. No.: 10/239,225

(22) PCT Filed: Mar. 19, 2001

(86) PCT No.: PCT/JP01/02182
§ 371 (c)(1),
(2), (4) Date: Sep. 20, 2002

(87) PCT Pub. No.: WO01/70826
PCT Pub. Date: Sep. 27, 2001

(65) Prior Publication Data
US 2003/0023021 A1 Jan. 30, 2003

(30) Foreign Application Priority Data
Mar. 21, 2000 (JP) .......................................... 2000-78423

(51) Int. Cl.⁷ .............................. C08K 3/20; C08L 31/00
(52) U.S. Cl. ..................... 524/832; 524/833; 524/501; 524/556; 526/909
(58) Field of Search .......................... 526/909; 524/832, 524/501, 556, 833

(56) References Cited

U.S. PATENT DOCUMENTS

| | | | |
|---|---|---|---|
| 5,559,202 A | | 9/1996 | Yoshikawa ................... 526/207 |
| 5,626,959 A | * | 5/1997 | Mills et al. .................. 428/331 |
| 5,753,742 A | * | 5/1998 | Bumanlag ................... 524/501 |
| 5,872,198 A | * | 2/1999 | Mosbach et al. ............ 526/201 |
| 6,030,739 A | * | 2/2000 | Ishikawa et al. .......... 430/108.3 |
| 6,040,380 A | * | 3/2000 | Dunaway et al. ............ 524/832 |
| 6,046,791 A | * | 4/2000 | Kobayashi et al. .......... 349/193 |
| 6,228,935 B1 | * | 5/2001 | Dunaway et al. ............ 524/832 |

FOREIGN PATENT DOCUMENTS

| | | | |
|---|---|---|---|
| JP | S63-117040 | | 5/1988 |
| JP | H02-014222 | | 1/1990 |
| JP | H03-234734 | | 10/1991 |
| JP | H05-317688 | | 12/1993 |
| JP | 07102146 | * | 4/1995 |
| JP | H07-157672 | | 6/1995 |
| JP | 07311934 | * | 11/1995 |
| JP | H10-217608 | | 8/1998 |
| JP | H10-218950 | | 8/1998 |
| JP | 2000-038455 | | 2/2000 |
| SU | 1511259 A | * | 1/1987 |
| WO | WO98/34969 | | 8/1998 |

* cited by examiner

Primary Examiner—Tatyana Zalukaeva
(74) Attorney, Agent, or Firm—Rader, Fishman & Grauer PLLC

(57) ABSTRACT

Subjects of the present invention are to provide resin particles having high ability and suitable for various purposes and to provide preparation method thereof.

This invention provides resin particles each of which is formed by two curved surfaces or by one curved surface and one plane surface, has a boundary line between these two surfaces and satisfies the relationships:

$$0.1 \ \mu m \leq D \leq 500 \ \mu m \tag{I}$$

$$0.05 \leq d/D \leq 0.8 \tag{II}$$

wherein D is particle diameter in horizontal direction and d is the maximum height in longitudinal direction in a side view in which the boundary line is placed in horizontal direction.

18 Claims, 5 Drawing Sheets

RESIN PARTICLES AND PROCESS FOR PRODUCING THE SAME

TECHNICAL FIELD

This invention relates to resin particles having specific shapes and suitable for use in the field of electronic industry such as LCD spacer, surface modifier for silver salt film, film modifier for magnetic tape, running stabilizer for heat-sensitive paper, etc.; field of rheology controlling agent, ink and adhesive; medical field such as particle for detecting antigen-antibody reaction, etc.; field of cosmetics such lubricant, etc.; or field of other general industries such as low shrinking agent, paper, dental material, modifier of resin, etc., and to preparation method thereof.

TECHNICAL BACKGROUND

Various kinds of resin particles are used for various purposes, for example, for improving mechanical properties of plastics, for improving cleaning properties without changing the chargeability of developing agent, for improving flatting or opacifying effect of paint, for improving slip properties of cosmetics, and the like.

Since these resin particles are prepared by grinding method, emulsion polymerization method, suspension polymerization method, seed polymerization method, dispersion polymerization method, or the like, only indeterminate resin particles or spherical resin particles are usually obtained, and these resin particles are not sufficiently enough for a use in which further function is required.

For instance, flat resin particles obtained by emulsion polymerization method and having concavity are disclosed in Japanese Patent Kokai No. Hei 2(1990)-14222. However, since the resin particles are prepared by emulsion polymerization method, it is difficult to obtain flat particles having size of 1 μm or more. Further, non-spherical hollow resin particles obtained by suspension polymerization method are disclosed in Japanese Patent Kokai No. Hei 3(1991)-234734, and wooden-bowl shaped fine particles obtained by suspension polymerization method and their preparation method are disclosed in Japanese Patent Kokai No. Hei 5(1993)-317688 and U.S. Pat. No. 5,559,202. And further, wooden-bowl shaped polymer particles obtained by co-polymerization of a monomer containing acid group and a monomer which can be co-polymerized with it and their preparation method are disclosed in WO98/34969 derived from Japanese Patent Kokai No. Hei 10(1998)-218950 and Japanese Patent Kokai No. Hei 10(1998)-217608.

Since these resin particles are hollow and do not have so remarkable characteristics in their shapes in comparison with spherical particles, they emit strong scattering light, and only particles of limited resin composition can be obtained. Therefore, these resin particles are not enough for exhibiting various functions required.

On the other hand, plate-like particles and disk-like particles and their preparation method are disclosed in Japanese Patent Kokai No. Sho 63(1988)-117040 and Japanese Patent Kokai No. Hei 7(1995)-157672. Although these particles have novel shapes as resin particles, the shape is plate-like and accordingly those particles do not have remarkable characteristics in comparison with known plate-like inorganic compounds such as talc, mica, etc. And since they are prepared by specific method, it is difficult to produce and use them in an industrial level.

Hence, development of resin particles having high level of functions required in each field of application and suitable for various purposes has been desired.

The present invention was made for meeting such desire, and its subject is to provide resin particles having high level of functions and novel shapes suitable for various purposes and to provide preparation methods thereof.

DISCLOSURE OF INVENTION

The inventors studied intensively to solve the problems as mentioned in the above and found that resin particles having novel shapes formed by two curved surfaces or by one curved surface and one plane surface, between which there is a boundary line, can be obtained by mixing a polymeric vinyl monomer and a hydrophobic liquid compound, which has a specific viscosity and does not co-polymerize with the polymerizable vinyl monomer, in a specified ratio and then subjecting the mixture to suspension polymerization in the absence of any crosslinking agent. The inventors further found that number of particles per unit weight of the resin particles thus obtained is larger than those of resin particles having a shape of hemisphere, rugby ball, wooden bowl, go stone as reported in the past, and accordingly the resin particles of the present invention can sufficiently exhibit various effects with smaller amount of content than those of the above known resin particles when they are added to a product for external use.

Thus, according to the present invention, resin particles each of which is formed by two curved surfaces or one curved surface and one plane surface and a boundary line between these surfaces, and satisfies the following numerical relationships:

$$0.1\ \mu m \leq D \leq 500\ \mu m \tag{I}$$

$$0.05 \leq d/D \leq 0.8 \tag{II}$$

wherein D is a particle diameter in horizontal direction and d is the maximum height in longitudinal direction when the boundary line is placed in horizontal direction.

Further, according to the present invention, a method for preparing the resin particles is provided, which is characterized by mixing 100 parts by weight of a polymerizable vinyl monomer and 5–200 parts by weight of a hydrophobic liquid compound which has viscosity of 10–1000000 cSt and does not co-polymerize with the polymerizable vinyl monomer and then subjecting the mixture to suspension polymerization in the absence of any crosslinking agent.

And further, according to the present invention, a method for preparing the resin particles is also provided, which is characterized by mixing 100 parts by weight of a polymerizable vinyl monomer and 41–2000 parts by weight of a fluorinated liquid compound which has viscosity of 0.1–9 cSt at 25° C. and does not co-polymerize with the polymerizable vinyl monomer and subjecting the mixture to suspension polymerization in the absence of any crosslinking agent.

DETAILED DESCRIPTION OF INVENTION

The resin particles of the present invention are each formed by two curved surfaces or one curved surface and one plane surface and has a boundary line between these surfaces.

The curved surface and plane surface mean normally the uniform surface with no break, cavity or the like. However, there may be a part of lack of uniformity such as slight break, cavity or the like on the surface as far as the effect of the present invention can be recognized.

The boundary line means the one which can be recognized when a resin particle is observed by an electron micrograph or the like, and width of the boundary line is normally about 1/10 or less of the maximum height of the particle. Hence, the boundary line includes the one which is partially or wholly rounded and can not be clearly recognized and the one which is not consecutive as a whole by a partial break as far as the effect of the present invention can be achieved.

When the boundary line between the two surfaces forming the resin particle of the present invention is placed in horizontal direction, the plane figure of the particle becomes a round or almost round shape.

Particularly, the shapes of the resin particles of the present invention are generally classified in the following three types according to the shapes of the two surfaces located on both sides of the boundary line.

Figure 1:
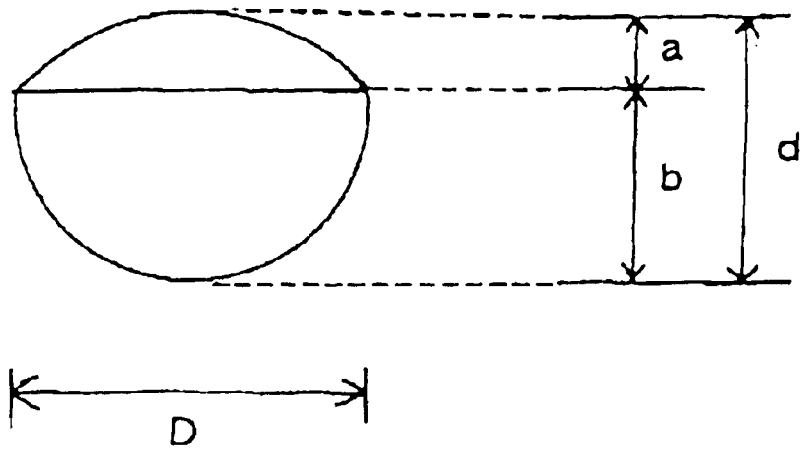
FIG. 1 is a typical drawing of the resin particle obtained by the present invention and classified in Type A.
Figure 2:
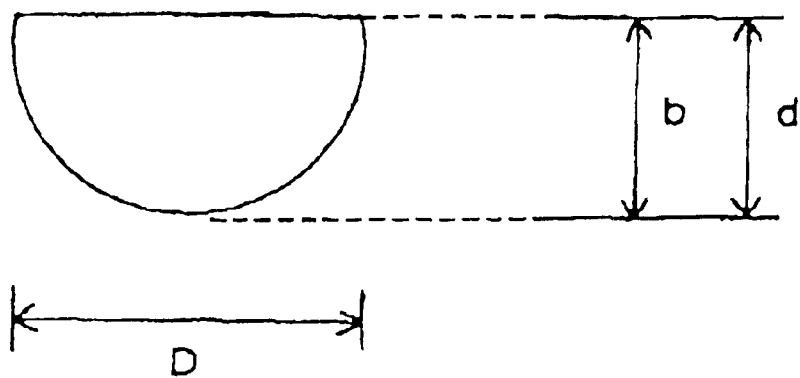
FIG. 2 is a typical drawing of the resin particle obtained by the present invention and classified in Type B.
Figure 3:
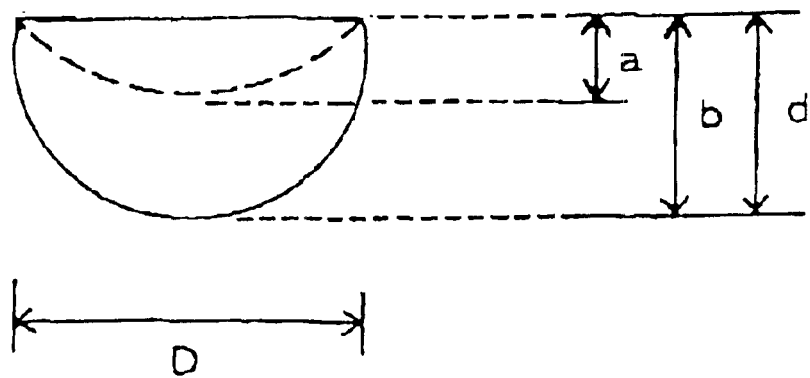
FIG. 3 is a typical drawing of the resin particle obtained by the present invention and classified in Type C.

That is, when the boundary line is placed in horizontal direction and a resin particle is viewed from a side, the resin particles of the present invention are classified in the following three types, namely, a type where convexly curved surface appears upward of the boundary line and another convexly curved surface appears downward of the boundary line (hereinafter referred to as "Type A": see FIG. 1); a type where one plane surface overlaps with the boundary line and one convexly curved surface appears upward or downward of the boundary line (hereinafter referred to as "Type B": see FIG. 2); and a type where both of one convexly curved surface and one concavely curved surface appear in the same side of the boundary line, for example, downward of the boundary line (hereinafter referred to as "Type C": see FIG. 3).

More particularly, preferable resin particles of the present invention satisfy the following numerical relationships:

$$0.1 \ \mu m \leq D \ 500 \ \mu m \tag{I}$$

$$0.05 \leq d/D \leq 0.8 \tag{II}$$

wherein D is a particle diameter in horizontal direction and d is the maximum height in longitudinal direction when the boundary line is placed in horizontal direction.

Further, from the viewpoints of excellent slip properties, light scattering properties, light condensing properties, etc., preferable resin particles of the present invention satisfy the following numerical relationship:

$$0.4 \leq d/D \leq 0.8 \tag{II'}$$

and more preferable particles satisfy the following numerical relationship:

$$0.5 \leq d/D \leq 0.6 \tag{II''}$$

Meanwhile, from the viewpoint of excellent adherability and sticking properties, preferable resin particles of the present invention satisfy the following numerical relationship:

$$0.05 \leq d/D \leq 0.4 \tag{II'''}$$

and more preferable resin particles satisfy the following numerical relationship:

$$0.1 \leq d/D \leq 0.3 \tag{II''''}$$

It is possible to easily control the properties of the resin particles of the present invention so that the resin particles have properties of spherical resin particles or properties of plate-like resin particles by controlling the distances a and b, wherein a and b are the longest distances from the boundary line to each surface in the side view when the boundary line is placed in horizontal direction, provided that $0 < a \leq b$ in Type A, $a=0$ and $a<b$ in Type B and $0<a<b$ in Type C.

Particularly, from the viewpoint of excellent adherability and sticking properties, preferable resin particles of the present invention satisfy the relationship:

$$0 \leq a/b \leq 0.3 \tag{IV}$$

More preferable resin particles satisfy the relationship:

$$0 \leq a/b \leq 0.2 \tag{IV'}$$

and the most preferable resin particles satisfy the relationship:

$$a/b=0 \tag{IV''}$$

Meanwhile, from the viewpoint of excellent slip properties, preferable resin particle of the present invention satisfy the relationships;

$$0.3 \leq a/b \leq 1.0 \tag{VI}$$

more preferable resin particles satisfy the relationship:

$$0.5 \leq a/b \leq 1.0 \tag{VI'}$$

and the most preferable resin particles satisfy the relationship:

$$0.7 \leq a/b \leq 1.0 \tag{VI''}$$

Among the resin particles which satisfy the above relationships, resin particles of Type A and Type B are particularly preferable since these particles have balanced properties between the spherical particles and the plate-like particles.

More particularly, in order to exhibit the adherability and sticking properties in addition to the properties of the spherical particles, more preferable resin particles of the present invention satisfy the following relationships;

$$0.3 \leq d/D \leq 0.8 \tag{III}$$

$$0 < a/b < 0.3 \tag{IV}$$

For the above purpose, further preferable resin particles satisfy the following relationships:

$$0.4 \leq d/D \leq 0.6 \tag{III'}$$

$$0 < a/b < 0.2 \tag{IV'}$$

Further, the most preferable particles satisfy the relationships:

$$0.4 \leq d/D \leq 0.6 \quad \text{(III')}$$

$$a/b=0 \quad \text{(IV'')}$$

Preferable resin particles of the present invention which have characteristics of the spherical particles, more excellent optical properties, suitable adherability and sticking properties as well as larger specific surface area are formed with two convexly curved surfaces and satisfy the following relationships:

$$0.1 \leq d/D \leq 0.8 \quad \text{(V)}$$

$$0.3 \leq a/b \leq 1.0 \quad \text{(VI)}$$

For the above purpose, further more preferable resin particles satisfy the following relationships:

$$0.2 \leq d/D \leq 0.5 \quad \text{(V')}$$

$$0.4 \leq a/b \leq 1.0 \quad \text{(VI'')}$$

Resin particles which do not satisfy any of the relationships (I) and (II), (III) and (IV) or (III) and (IV') or (V) and (VI) are not preferable, because such particles show properties similar to those of either spherical particles or plate-like particles and the object of present invention can not be achieved by those particles.

Resin particles which do not have any void in each particle are preferable from the viewpoint of the optical properties such as light scattering properties, light condensing properties, etc. produced by the shape of the resin particles of the present invention.

Each value of D, a, b and d were determined by observing through electron microscope or optical microscope or by a similar method thereto, or by measuring or calculating by means of printed image analysis, and their average values mean the number average values.

Preferable examples of the resin constituting the resin particles of the present invention are thermosetting resins such as phenol resin, furan resin, xylene-formaldehyde resin, ketone-formaldehyde resin, urea resin, melamine resin, aniline resin, alkyd resin, unsaturated polyester resin, epoxy resin, etc.; thermoplastic resins such as polyethylene, polypropylene, styrene-type resin, vinyl ester-type resin, acryl-type resin, methacryl-type resin, polyvinyl chloride, polyvinylidene chloride, fluoro resin, polyvinyl ether, polyvinyl ketone, polyether, polycarbonate, thermoplastic polyester, polyamide, diene-type resin, polyurethane-type resin, aromatic polyamide, polyphenylene, polyxylene, polyphenylene oxide, polysulphone, silicone resin, etc.; natural resins such as natural gum resin, cellulose-type resin, protein-type resin etc., and the like.

Among these resins, acryl-type resin, methacryl-type resin, styrene-type resin, vinyl ester-type resin and co-polymer thereof are preferable.

The resin particles of the present invention can be obtained, for example, by suspension polymerization, particularly by mixing 100 parts by weight of a polymerizable vinyl monomer (hereinafter referred to as "vinyl monomer") and a hydrophobic liquid compound which has viscosity of 10–1,000,000 cSt at 25° C. and does not co-polymerize with the vinyl monomer (hereinafter referred to as "liquid compound"), and then subjecting the mixture to suspension polymerization.

According to this method, specific manufacturing apparatus is not needed, and the particles of widely various kinds of resins can be easily manufactured with low cost, and further the shapes of the particles can be easily controlled.

The vinyl monomer used in the method of the present invention may be the one which can be dissolved in the liquid compound mentioned below but does not react with the liquid compound in the polymerization reaction or crosslinking reaction. Examples of such vinyl monomers may be, for example, styrene type monomers such as styrene, p-methylstyrene, p-tert-butylstyrene, etc.; acrylic acid ester monomers such as methyl acrylate, ethyl acrylate, propyl acrylate, butyl acrylate, 2-ethylhexyl acrylate, lauryl acrylate, etc.; methacrylic acid ester monomers such as methyl methacrylate, ethyl methacrylate, propyl methacrylate, butyl methacrylate, iso-butyl methacrylate, tert-butyl methacrylate, benzyl methacrylate, phenyl methacrylate, iso-bornyl methacrylate, cyclohexyl methacrylate, glycidyl methacrylate, hydrofurfuryl methacrylate, lauryl methacrylate, etc.; mono-functional hydrophobic vinyl monomers having a vinyl group in a molecule such as alkyl vinyl ether monomers (e.g. polyethyleneglycol mono(metha) acrylate, methyl vinyl ether, etc.), vinyl ester monomers (e.g. vinyl acetate, vinyl butyrate, vinyl pivalate, vinyl benzoate, vinyl neodecanoate, etc.), N-alkyl-substituted acrylamide monomers (e.g. N-methyl acrylamide, N-ethylacrylamide, etc), nitrile monomers such as acrylonitrile, (metha)acrylonitrile etc.), or these monomers substituted with halogen (e.g. fluorine, bromine, chlorine), or the like. The vinyl monomer may be selected from the above according to the object, and can be used alone or in combination of two or more kinds of the monomers.

The liquid compound used in the method of the present invention may be the one which has viscosity of 10–1,000,000 cSt at 25° C. and does not have co-polymerizability with a vinyl monomer, among which preferable one does not have crosslinking reactivity with a functional group existing in the vinyl monomer, and further preferable one is not deteriorated by water.

Examples of such liquid compounds may be polysiloxane such as dimethyl polysiloxane, methyl hydrogen polysiloxane, methyl phenyl polysiloxane etc.; hydrocarbon such as liquid paraffin, polybutene, polyisobutylene, etc. or the like. Particularly, hydrocarbons such as paraffin hydrocarbons, olefin hydrocarbons, alicyclic hydrocarbons, etc., liquid polymers of hydrocarbons, such as liquid polypropylene, liquid polybutene, liquid polyisobutylene, etc. or liquid polysiloxanes having siloxane bond may be exemplified. Among the above, preferable ones are normal paraffin, iso-paraffin, monocyclic cycloparaffin, dicyclic cycloparaffin, liquid polypropylene, liquid polybutene, liquid polyisobutylene having viscosity of 50–100,000 cSt at 25° C. and organopolysiloxane having viscosity of 20–1,000,000 cSt at 25° C. Among the above, further preferable ones are liquid paraffin, hydrogenated polybutene, hydrogenated polyisobutylene having viscosity of 50–100,000 cSt at 25° C., and dimethyl polysiloxane, diphenyl polysiloxane, methyl phenyl polysiloxane, methyl hydrogen polysiloxane having viscosity of 20–1,000,000 cSt at 25° C. These liquid compounds may be used alone or in combination of two or more kinds thereof.

The resin particles of the present invention can be prepared by mixing and dissolving 100 parts by weight of the vinyl monomer and 5–200 parts by weight of the liquid compound and then subjecting the mixture to suspension polymerization reaction.

In the process of this invention, a polymerization initiator can be used in the suspension polymerization. As the polymerization initiator, a lipophilic peroxide or an azo-type initiator which is usually used in the suspension polymerization can be used. Particularly, peroxide-type polymerization initiator such as benzoyl peroxide, lauroyl peroxide, octanoyl peroxide, orthochlorobenzoyl peroxide, orthomethoxybenzoyl peroxide, methyl ethyl ketone peroxide, diisopropyl peroxy dicarbonte, cumen hydroperoxide, cyclohexanone peroxide, tert-butyl hydroperoxide, diisopropylbenzene hydroperoxide, etc., 2,2'-azobisisobutyronitrile, 2,2'-azobis(2,4-dimethylvaleronitrile), 2,2'-azobis(2,3-dimethylbutyronitrile), 2,2'-azobis(2-methylbutyronitrile), 2,2'-azobis(2,3,3-trimethylbutyronitrile), 2,2'-azobis(2-isopropylbutyronitrile), 1,1'-azobis(cyclohexane1-carbonitrile), 2,2'-azobis(4-methoxy-2,4-dimethlvaleronitrile), 2-(carbamoylazo)isobutyronitrile, 4,4'-azobis(4-cyanovaleric acid), dimethyl-2,2'-azobisisobutyrate, and the like may be exemplified. Among these polymerization initiators, benzoyl peroxide, lauroyl peroxide, 2,2'-azobisisobutyronitrile, 2,2'-azobis(2,4-dimethylvaleronitrile) and the like are preferable, since they have half life suitable for the suspension polymerization of the present invention.

About 0.01–20 parts by weight, more preferably 0.1–10 parts by weight of the polymerization initiator is added to 100 parts by weight of the vinyl monomer.

In the suspension polymerization of the method of this invention, it is preferable for stabilizing the suspended particles to use 100–1,000 parts by weight of water as a dispersion medium to 100 parts by weight of a mixture of the vinyl monomer and the liquid compound (hereinafter referred to as "monomer composition"), and to add a dispersion stabilizer to the dispersion medium.

As the dispersion stabilizer, water-soluble organic high-molecular compounds and water slight-soluble inorganic compounds such as phosphate (e.g. calcium phosphate, magnesium phosphate, aluminium phosphate, zinc phosphate, etc., pyrophosphate (e.g. calcium pyrophosphate, magnesium pyrophosphate, aluminium pyrophosphate, zinc pyrophosphate, etc., calcium carbonate, magnesium carbonate, calcium hydroxide, magnesium hydroxide, aluminium hydroxide, calcium metasilicate, calcium sulfate, barium sulfate, colloidal silica, and the like may be exemplified. Among the above, calcium tertialy phosphate, colloidal silica as well as magnesium pyrophosphate and calcium pyrophosphate obtained by double decomposition method are preferably used from the viewpoint that the resin particles of this invention can be stably produced.

These dispersion stabilizers may be used alone or in combination of two or more kinds thereof. The amount of the dispersion stabilizer is normally about 0.5–20 parts by weight per 100 parts by weight of the monomer composition. However, the kind and amount of the stabilizer may be optionally selected by taking account of the particle diameter of the resin particles obtained and of the dispersion stability during the polymerization.

In the present invention, a surfactant such as anionic surfactant, cationic surfactant, ampho-ionic surfactant or non-ionic surfactant may be used in addition to the above-mentioned dispersion stabilizer.

As the anionic surfactant, fatty acid oil such as sodium oleate, castor oil potassium, etc., alkyl sulfuric acid ester salt such as sodium laurylsulfate, ammonium laurylsulfate, etc., alkylbenzene sulfonate such as sodium dodecyl benzenesulfonate, etc., alkyl naphthalenesulfonate, alkanesulfonate, dialkyl sulfosuccinate, alkyphosphoric acid ester salt, naphthalenesulfonic acid-formalin condensed product, polyoxyethylenealkyl phenyl ether sulfuric acid ester salt, polyoxyethylenealkyl sulfuric acid ester salt, and the like may be exemplified.

As the cationic surfactant, alkylamine salt such as laurylamine acetate, stearylamine acetate, etc., quarternary ammonium salt such as lauryltrimethyl ammonium chloride, etc., and the like may be exemplified.

As the ampho-ionic surfactant, lauryldimethylamine oxide and the like may be exemplified.

As the non-ionic surfactant, polyoxyethylenealkyl ether, polyoxyethylenealkyl phenyl ether, polyoxyethylene fatty acid ester, sorbitane fatty acid ester, polyoxysorbitane fatty acid ester, oxyethyleneoxypropylene block polymer and the like may be exemplified.

These surfactants may be used alone or in combination of two or more kinds thereof. The amount of the surfactant is normally about 0.001–0.2 parts by weight per 100 parts by weight of water. However, the kind and amount of the surfactant may be optionally selected by taking account of the particle diameter of the resin particles obtained and of the dispersion stability during the polymerization.

The suspension polymerization of the invention is carried out after dispersing the liquid drops of the monomer composition in a dispersion medium by adding the monomer composition directly into the dispersion medium and then stirring the mixture by means of propeller, normal homo-mixer which is a dispersing machine utilizing high shearing force generated by rotor and stator or ultrasonic dispersing machine.

In order to make even the particle diameter of the resin particles obtained, it is preferable to use a high-pressure dispersing machine such as microfluidizer, nanomizer, etc., in which high crash power among the liquid drops or against the vessel wall is utilized, or to introduce the vinyl monomer into the dispersion medium under pressure through a porous film of MPG (micro-porous glass).

Then, the suspension polymerization is carried out by heating the dispersion medium in which the monomer composition is dispersed as the spherical liquid drops.

During the polymerization, it is preferable to stir the medium slowly so that the floating of the monomer drops and the precipitation of the produced resin particles are prevented.

The reaction temperature of the suspension polymerization is preferably 30–100° C., more preferably 40–80° C. The reaction time is usually about 0.1–10 hours.

After completion of the polymerization reaction, the dispersion stabilizer is decomposed by hydrochloric acid or the like, if necessary, and then the resin particles are separated from the dispersion medium by means of suction filtration, centrifugation, centrifugal filtration, or the like. Thus obtained cake of the resin particles containing water is further washed with water and then dried to give the objective resin particles.

In the case where thus obtained resin particles contain the liquid compound, it is preferable to remove the liquid compound from the particles.

Concretely, the liquid compound can be removed by distilling the obtained mixture or by washing the mixture with a solvent in which the liquid compound is dissolved but the resin particles are not dissolved.

When the liquid compound is liquid paraffin which can be removed by distillation, said liquid compound is preferably removed by subjecting the slurry after the polymerization to distillation under heating, distillation under reduced pressure or steam distillation, or by dispersing the resin particles, which are separated from the dispersion medium, in water and then subjecting the resultant dispersion to distillation.

When the liquid compound is polysiloxane or polybutene which can not be easily removed by distillation, said liquid compound is preferably removed by washing with a proper solvent. In general, lower alcohol such as methanol, ethanol, iso-propanol, iso-butanol, etc., lower hydrocarbon such as pentane, hexane, heptane, octane, cyclohexane, etc., ether such as diethyl ether, dibutyl ether, etc. or the like is used as a washing solvent, though it depends on the kind of the liquid compound and the kind of the resin particles.

Purified resin particles can be obtained by repeating the above-mentioned operation, if necessary.

Since any crosslinking agent is not used in the method of the present invention, the resultant resin particles are not crosslinked. However, crosslinked particles can be obtained by applying crosslinking operation to the resin particles after polymerization or after drying.

For example, when the resin particles are obtained by co-polymerizing glycidyl methacrylate or the like, which is a monomer having a glycidyl group, as a vinyl monomer, crosslinking can be conducted by treating the resultant resin particles with a diamine such as ethylenediamine, phenyldiamine or the like in an organic solvent.

In general, diameter of the resin particle is 0.1–500 μm, preferably 0.2–200 μm, while the diameter of the resin particles can be optionally controlled by mixing condition of the vinyl monomer and water, amount of the dispersion stabilizer, etc., stirring condition, or the like.

The shape of the resultant resin particles are affected by the kinds and ratio of the vinyl monomer and the liquid compound, speed of the polymerization reaction and diameter of the resin particles. Particularly, the value of d/D is remarkably affected by the ratio of the liquid compound.

For example, resin particles which satisfy the relationship:

$$0.4 \leq d/D \leq 0.8$$

are liable to be obtained when the suspension polymerization is carried out by mixing 5–40 parts by weight, preferably 10–35 parts by weight of the liquid compound with 100 parts by weight of the vinyl monomer.

And, resin particles which satisfy the relationship:

$$0.05 \leq d/D \leq 0.4$$

are liable to be obtained when the suspension polymerization is carried out by mixing 50–200 parts by weight, preferably 55–180 parts by weight of the liquid compound with 100 parts by weight of the vinyl monomer.

Further, the resin particles of Type C are liable to be obtained when a vinyl monomer having a low specific gravity such as styrene, vinyl pivalate or the like is used, where the specific gravity of the polymer becomes 1.1 or lower, and dimethylpolysiloxane or liquid paraffin is used as a liquid compound, and 5–20 parts by weight of the latter is used for 100 parts by weight of the former.

And further, the resin particles of Type A are liable to be obtained when the above-mentioned liquid compound is used in an amount of more than 20 parts by weight for 100 pats by weight of the vinyl monomer.

Furthermore, the resin particles of Type B are liable to be obtained when a methacrylate monomer is used as a vinyl monomer, where the specific gravity of the polymer becomes higher than 1.1, and 5–13 parts by weight of a liquid compound is used for 100 parts by weight of the vinyl monomer.

And further, the resin particles of Type A are liable to be obtained when a liquid compound is used in an amount of 13 parts by weight or more for 100 parts by weight of the vinyl monomer as mentioned in the above.

Another method of the present invention may be carried out by suspension polymerization in the absence of the crosslinking agent, wherein 41–2,000 parts by weight of a hydrophobic fluorinated liquid compound which has viscosity in a range of 0.1 to less than 9 cSt and does not co-polymerize with a vinyl monomer (hereinafter referred to as "fluorinated liquid compound") is mixed with 100 parts by weight of the vinyl monomer.

The vinyl monomer may be the one which homogeneously dissolves the fluorinated liquid compound as mentioned below, but has not polymerization reactivity or crosslinking reactivity with said liquid compound. Examples of such vinyl monomers may be the ones as mentioned before.

The fluorinated liquid compound used in the method of this invention has not co-polymerizability with the vinyl monomer and has viscosity in a range from 0.1 to less than 9 cSt. Preferable fluorinated liquid compound is the one which does not react with functional group(s) existing in the vinyl monomer to form a crosslink during the suspension polymerization, does not react with water as a medium for the suspension polymerization reaction, is not dissolved in water and is not deteriorated by water.

Examples of such fluorinated liquid compounds may be organic compounds such as liquid hydrocarbons, halogenated hydrocarbons, nitro hydrocarbons, amines, alcohols, ethers, ketones, esters, acids and the like, in which a part or all of the hydrogen atoms is(are) substituted with fluorine atom(s).

Among these organic compounds, fluorinated compounds having a boiling point at 25–200° C., particularly 50–150° C. under 1 atmospheric pressure is preferable, because the resin particles can be produced without using any high-pressure polymerization apparatus or the like, and the fluorinated liquid compound can be easily removed after the polymerization reaction and accordingly the residue of the fluorinated liquid compound in the resultant resin particles can be controlled in a very low level.

Further, among the fluorinated liquid compounds, saturated hydrocarbons and ethers in which a part or all of the hydrogen atoms is(are) substituted with fluorine atom(s) are more preferable, because the resin particles having a desired shape can be easily obtained with respect to wide range of kinds of the resins. The ratio of fluorine contained is such fluorinated liquid compounds is about 30–90% by weight, and preferably about 40–80% by weight.

The kinds of such fluorinated liquid compounds are not restricted, and perfluoropentane, perfluorohexane, perfluoroheptane, perfluorooctane, heptafluorocyclopentane, methyl perfluorobutyl ether, ethyl perfluorobutyl ether, propyl perfluorobutyl ether, butyl perfluorobutyl ether, and the like may be exemplified.

These fluorinated liquid compounds are preferable, because they have low viscosity as well as excellent operability and solubility in the vinyl monomer, and also washing of the apparatus after polymerization reaction can be easily carried out.

The fluorinated compound can be used with a normal organic solvent which is not dissolved in water and not reactive with the vinyl monomer and the fluorinated liquid compound, for example hydrocarbon solvent such as pentane, hexane, heptane, etc. or ether solvent such as diethyl ether, methyl ethyl ether, dibutyl ether, etc.

Hydrous suspension polymerization in another method of this invention may be carried out in the same way as above and the same dispersion stabilizer as the above may be used.

The reaction time is normally about 0.1–20 hours. In the case where boiling point of the fluorinated liquid compound or the vinyl monomer is close to the polymerization temperature or lower than the polymerization temperature, it is preferable to carry out the polymerization in a closed apparatus or under pressure by using a pressure resistant polymerization apparatus for avoiding the volatilization or vaporization of the fluorinated liquid compound and/or the vinyl monomer.

The step for obtaining the resin particles after the polymerization reaction is carried out as mentioned in the above.

The fluorinated liquid compound remaining in the resin particles can be easily separated and removed from the resin particles by simple operation such as, for example, distillation under normal pressures, distillation under reduced pressure, steam distillation, or treatment with gas bubbling, treatment under reduced pressure or treatment under heating. Particularly, the fluorinated liquid compound can be easily removed by a method wherein the compound is directly distilled under normal pressures or reduced pressure from the slurry after polymerization, or by a method wherein the compound is distilled with steam, or by a method wherein the resin particles are separated from the dispersion medium and dried under normal pressures or reduced pressure.

The shape of the resin particles obtained by another method of the present invention vary depending on the kinds and ratio of the vinyl monomer and the fluorinated liquid compound, on speed of polymerization reaction and on diameter of the resin particles. Particularly, the value of d/D is influenced by ratio of the fluorinated compound, and the higher ratio of the fluorinated liquid compound is used, the smaller value of d/D is resulted.

For instance, resin particles satisfying the relationship:

$$0.4 \leq d/D \leq 0.8$$

are liable to be obtained when 41–220 parts by weight, preferable 50–200 parts by weight of a fluorinated liquid compound is used for 100 parts by weight of a vinyl monomer.

Resin particles satisfying the relationship:

$$0.05 \leq d/D \leq 0.4$$

are liable to be obtained when 250–2,000 parts by weight, preferably 300–1,800 parts by weight of a fluorinated liquid compound is used for 100 parts by weight of a vinyl monomer.

The diameter D of the resin particles can be optionally controlled by controlling mixing condition of the monomer composition and the hydrous medium, ratio of the dispersion stabilizer, etc., stirring condition, dispersion condition, and the like.

The diameter D of the resin particles is optionally selected in accordance with their use, and said diameter can be controlled in a range of 0.1–500 μm according to another method of this invention.

Since each of the resin particles of the present invention has spherical surface at least one side of the boundary line, the resin particles have characteristics of the spherical particles, for example, optical characteristics, such as excellent light scattering properties, light condensing properties, etc., friction characteristics such as slip properties, etc., while the normal disc-shaped particles, flat particles, plate-shaped particles, wooden-bowl-shaped particles having no boundary line and particles having horseshoe shape in a section do not possess such characteristics.

Further, since each of the resin particles of the present invention is formed with two surfaces, it has large specific surface area, and accordingly surface reactivity and ability for carrying functional substance, etc. of the particles are increased. And, since each particle is not spherical, not only the resin particles of this invention have specific optical characteristics which cannot be expected for the known spherical particles, but also chemical characteristics resulted by surface modification and physical characteristics such as flow properties, etc. of the resin particles of this invention are improved.

Furthermore, since each of the resin particles of this invention has a boundary line, the number of particles per unit weight is large in comparison with non-spherical resin particles having no boundary line, for example, hemispherical, rugby ball shaped, wooden-bowl shaped and go stone shaped particles which have been reported.

Therefore, the resin particles of the present invention exhibit sufficient effect with a small amount of combination when the particles are used in a product for external use.

Particularly, the resin particles of Type A exhibit more excellent optical characteristics than go stone shaped particles, each of which is similar to particle of Type A but has no boundary line.

The resin particles of Type B exhibit more excellent adherability than hemispherical particles, each of which is similar to particle of Type B but has no boundary line.

And further, the resin particles of Type C have larger specific surface area and exhibit more excellent ability for carrying functional substance and more excellent optical characteristics than wooden-bowl shaped particles, each of which is similar to particle of Type C but has no boundary line.

As mentioned in the above, the resin particles of the present invention can be suitably used in the fields of electronic industry, adhesive, medical treatment, cosmetics and other general industries.

BEST MODE FOR CARRYING OUT THE INVENTION

EXAMPLE

The present invention is explained by Examples in the following, but this invention is not limited by these Examples.

Example 1

A dispersion medium consisting of magnesium pyrophosphate (20 g) produced by double decomposition and water (200 g) was introduced in separable flask (500 ml), and sodium lauryl sulfate (0.25 g) was dissolved in the medium. On the other hand, a monomer composition was obtained by mixing homogeneously methyl methacrylate (MMA) (90 g), dimethyl polysiloxane (viscosity 1000 cSt at 25° C.) (log) and 2,2'-azobis(2,4-dimethyl valeronitrile) (0.3 g) and added to the above dispersion medium. The mixture was finely dispersed by mixing with homomixer (ULTRA TURRAX T-25, manufactured by IKA) at 10,000 rpm for about 10 seconds.

An agitating element, a thermometer and a cooler were installed in a flask, and the flask was placed in a water bath at 60° C. The air in the flask was sufficiently replaced with nitrogen gas, and polymerization reaction was carried out under heating with stirring at 200 rpm for 10 hours.

After confirming the completion of the polymerization reaction, the reaction mixture was cooled, and the dispersion agent was decomposed by adding hydrochloride to the slurry until pH became about 2. The particles produced were collected by suction filtration using a Buchner funnel equipped with a paper filter, and the particles were washed with deionized water (1.2 liter) to remove the dispersion agent.

The cake after suction filtration was dried and dispersed in cyclohexane. Suction filtration was repeated several times to give the objective resin particles. The shape of thus obtained particles was observed by an electron microscope and photographed.

Figure 4:
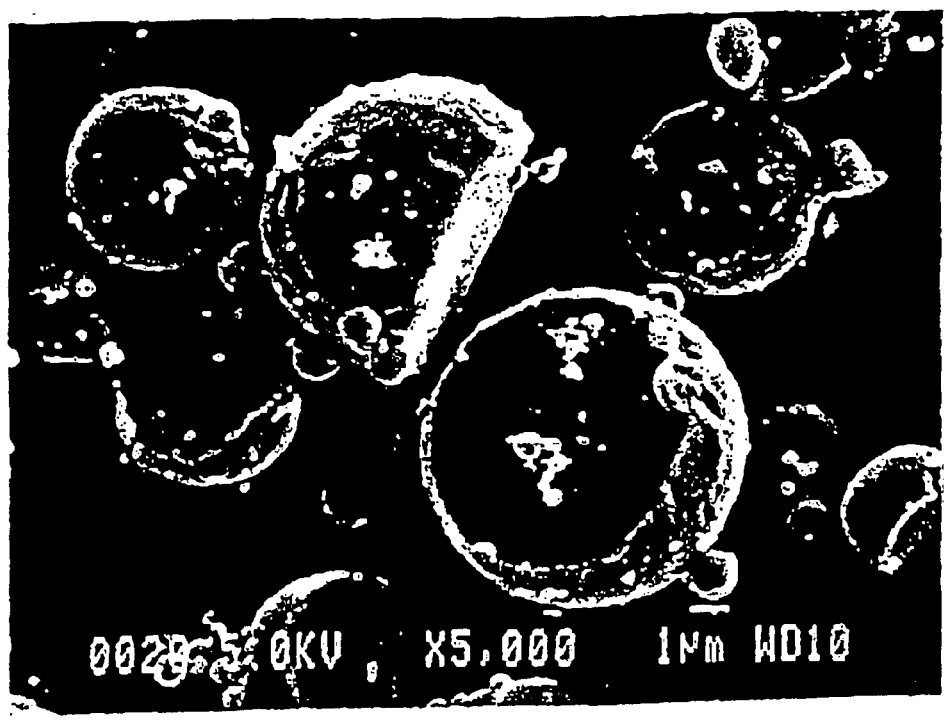
FIG. 4 is an electron micrograph of the resin particles obtained in Example 1.

As shown in the electron micrograph (FIG. 4), the each resin particle has a shape classified in Type B wherein one surface is flat.

Fifty particles were optionally selected from those in the photograph, and diameter of each particle was measured and average of the particle diameters was calculated. Further, 20 particles belonging to a range of each 30% upper and under of the particle diameter were selected, and the diameter D of each particle, the maximum height d of each particle, the maximum distance from the boundary line to each surface a and b were measured. The mean values d/D and a/b were calculated and the following results were obtained.

D=6.2 μm d/D=0.54 a/b=0

Example 2

Figure 5:
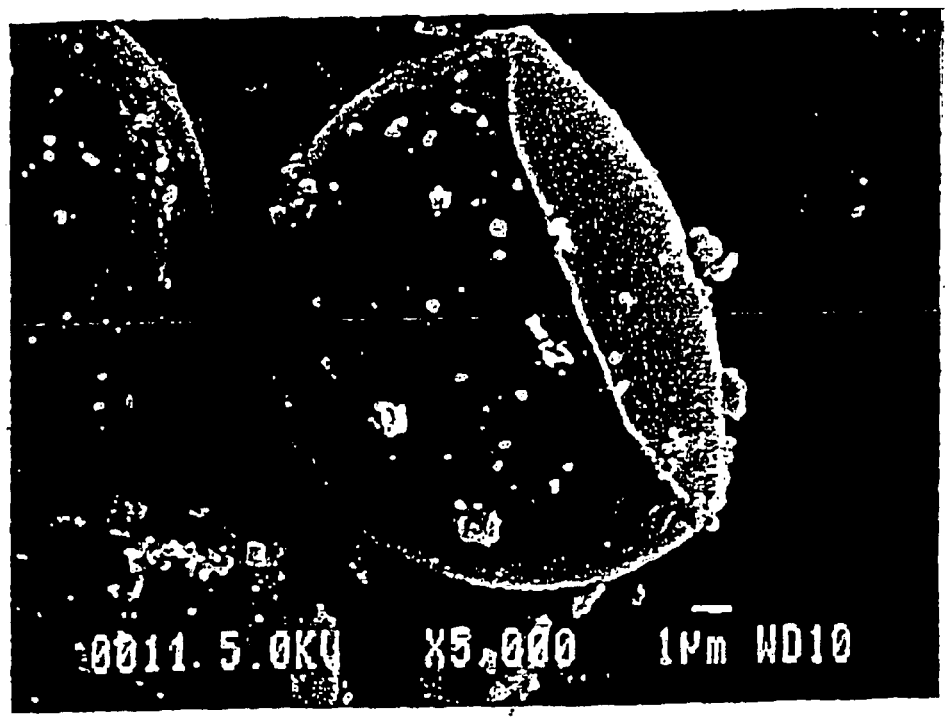
FIG. 5 is an electron micrograph of the resin particles obtained in Example 2.

Resin particles were obtained in the same manner as Example 1 with the exception that the dimethyl polysiloxane was replaced with dimethyl polysiloxane having viscosity of 10 cSt at 25° C. As shown in the electron micrograph (FIG. 5), each of the resin particles was formed with two convexly curved surfaces and had a shape classified in Type A. The values of their D, d/D and a/b were as follows, respectively.

D=5.5 μm d/D=0.77 a/b=0.19

Example 3

Resin particles were obtained in the same manner as Example 1 with the exception that the dimethyl polysiloxane was replaced with liquid paraffin having viscosity of 130 cSt at 25° C. Each of the resin particles was formed with two convexly curved surfaces and had a shape classified in Type A. The values of their D, d/D and a/b were as follows, respectively.

D=5.9 μm d/D=0.60 a/b=0.28

Example 4

Resin particles were obtained in the same manner as Example 1 with the exception that the dimethyl polysiloxane was replaced with hydrogenated polybutene having viscosity of 1,000 cSt at 25° C. Each of the resin particles was formed with two convexly curved surfaces and had a shape classified in Type A. The values of their D, d/D and a/b were as follows, respectively.

D=7.4 μm d/D=0.67 a/b=0.13

Example 5

Resin particles were obtained in the same manner as Example 1 with the exception that MMA was replaced with styrene (80 g), the amount of 2,2'-azobis(2,4-dimethyl valeronitrile) was changed to 2.0 g and the amount of dimethyl polysiloxane was changed to 20 g.

Figure 6:
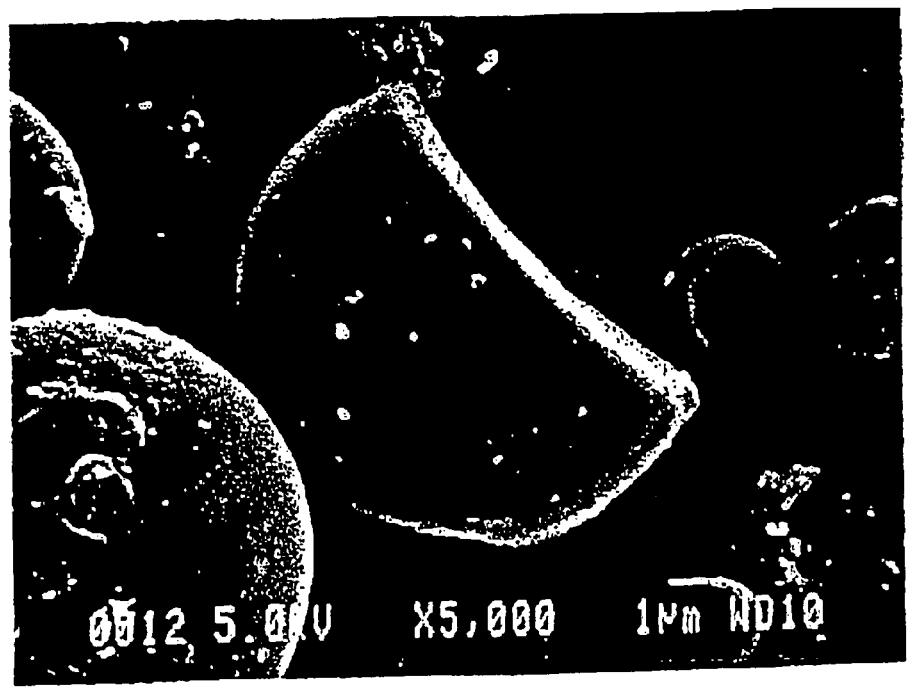
FIG. 6 is an electron micrograph of the resin particles obtained in Example 5.

As shown in the electron micrograph (FIG. 6), each of the resin particles was formed with a convexly curved surface and a concavely curved surface and had a shape classified in Type C. The values of their D, d/D and a/b were as follows.

D=11.8 μm d/D=0.66 a/b=0.13

Example 6

Resin particles were obtained in the same manner as Example 5 with the exception that styrene was replaced with vinyl pivalate, the amount of 2,2'-azobis(2,4-dimethyl valeronitrile) was changed to 0.3 g.

Each of the resin particles was formed with a convexly curved surface and a concavely curved surface and has a shape classified in Type C. The values of their D, d/D and a/b were as follows.

D=8.5 μm d/D=0.46 a/b=0.15

Example 7

Resin particles were obtained in the same manner as Example 1 with the exception that the dispersion medium (200 g), in which magnesium pyrophosphate was dispersed, was replaced with a dispersion liquid consisting 10% dispersion liquid (100 g) of tri-calcium phosphate and deionized water (100 g), the amount of MMA was changed to 80 g and the amount of dimethyl polysiloxane was changed to 20 g.

Each of the resin particles was formed with two convexly curved surfaces and had a shape classified in Type A. The values of their D, d/D and a/b were as follow, respectively.

D=7.1 μm d/D=0.55 a/b=0.15

Example 8

Resin particles were obtained in the same manner as Example 1 with the exception that the amount of MMA was changed to 80 g and the amount of dimethyl polysiloxane was changed to 20 g.

Figure 7:
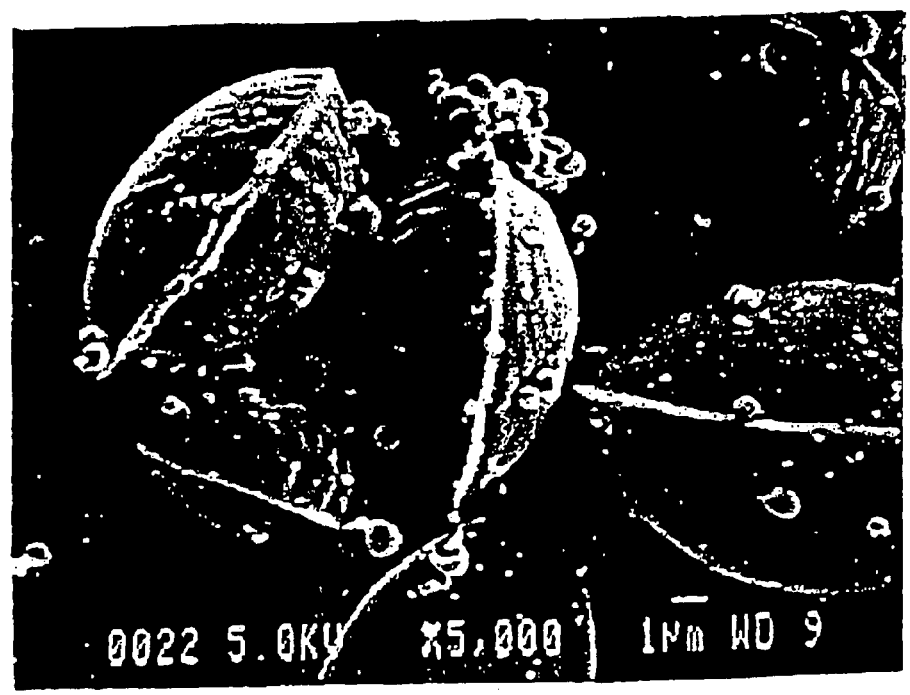
FIG. 7 is an electron micrograph of the resin particles obtained in Example 8.

As shown in the electron micrograph (FIG. 7), each of the resin particles was formed with two convexly curved surfaces and had a shape classified in Type A. The values of D, d/D and a/b were as follows, respectively.

D=4.5 μm d/D=0.52 a/b=0.72

Example 9

Resin particles were obtained in the same manner as Example 8 with the exception that the viscosity of dimethyl polysiloxane was changed to 100 cSt at 25° C.

Each of the resin particles had a shape classified in Type A, and their values of D, d/D and a/b were as follows, respectively.

D=4.8 μm d/D=0.58 a/b=0.75

Example 10

Resin particles were obtained in the same manner as Example 8 with the exception that dimethyl polysiloxane was replaced with methyl phenyl polysiloxane having viscosity of 100 cSt at 25° C.

Each of the resin particles had a shape classified in Type A, and their values of D, d/D and a/b were as follows, respectively.

D=6.5 μm d/D=0.53 a/b=0.88

Example 11

Resin particles were obtained in the same manner as Example 8 with the exception that dimethyl polysiloxane was replaced with methyl hydrogen polysiloxane having viscosity of 20 cSt at 25° C.

Each of the resin particles had a shape classified in Type A, and their values of D, d/D and a/b were as follows, respectively.

D=4.5 μm d/D=0.53 a/b=0.55

Example 12

Resin particles were obtained in the same manner as Example 8 with the exception that the viscosity of dimethyl polysiloxane was changed to 1,000,000 cSt at 25° C.

Each of the resin particles had a shape classified in Type A, and their values of D, d/D and a/b were as follows, respectively.

D=5.0 μm d/D=0.40 a/b=0.44

Example 13

Resin particles were obtained in the same manner as Example 8 with the exception that dimethyl polysiloxane was replaced with liquid paraffin having viscosity of 100 cSt at 25° C.

Each of the resin particles had a shape classified in Type A, and their values of D, d/D and a/b were as follows, respectively.

D=7.3 μm d/D=0.65 a/b=0.67

Example 14

Resin particles were obtained in the same manner as Example 8 with the exception that dimethyl polysiloxane was replaced with hydrogenated polybutene having viscosity of 1,000 cSt at 25° C.

Each of the resin particles had a shape classified in Type A, and their values of D, d/D and a/b were as follows, respectively.

D=11.3 μm d/D=0.75 a/b=0.98

Example 15

Resin particles were obtained in the same manner as Example 8 with the exception that MMA was replaced with trifluoroethyl methacrylate.

Each of the resin particles had a shape classified in Type A, and their values of D, d/D and a/b were as follows, respectively.

D=10.1 μm d/D=0.60 a/b=0.93

Example 16

Resin particles were obtained in the same manner as Example 8 with the exception that MMA was replaced with styrene and the amount of 2,2'-azobis(2,4-dimethylvaleronitrile) was changed to 2.0 g.

Each of the resin particles had a shape classified in Type A, and their values of D, d/D and a/b were as follows, respectively.

D=5.5 μm d/D=0.50 a/b=0.93

Example 17

Resin particles were obtained in the same manner as Example 1 with the exception that the homomixer "ULTRA TARRAX T-25" manufactured by IKA was replaced with "TK homomixer" manufactured by Tokushu Kika Kogyo and that number of rotations was changed to 500 rpm.

Each of the resin particles had a shape classified in Type A, and their values of D, d/D and a/b were as follows, respectively.

D=105 μm d/D=0.46 a/b=0.80

Example 18

Resin particles were obtained in the same manner as Example 8 with the exception that the number of rotations was changed to 20,000 rpm.

Each of the resin particles had a shape classified in Type A, and their values of D, d/D and a/b were as follows, respectively.

D=0.8 μm d/D=0.63 a/b=0.72

Comparative Example 1

Resin particles were obtained in the same manner as Example 1 with the exception that dimethyl polysiloxane was replaced with dimethyl polysiloxane having viscosity of 0.65 cSt at 25° C. The resin particles were spherical particles having average particle diameter of 14.3 μm.

Comparative Example 2

Resin particles were obtained in the same manner as Example 1 with the exception that the amount of MMA was changed to 99.5 g and the amount of dimethyl polysiloxane was changed to 0.5 g. The resin particles were spherical particles having average particle diameter of 8.1 µm.

Comparative Example 3

Resin particles were obtained in the same manner as Example 8 with the exception that dimethyl polysiloxane was replaced with dimethyl polysiloxane having viscosity of 0.65 cSt at 25° C. The resin particles were spherical particles having average particle diameter of 5.5 µm.

Comparative Example 4

Resin particles were obtained in the same manner as Example 8 with the exception that the amount of MMA was changed to 30 g and dimethyl polysiloxane was replaced with liquid paraffin (70 g) having viscosity of 130 cSt at 25° C. The resin particles were wooden-bowl-shaped particles having unclear boundary line between the two curved surfaces and having average particle diameter of 18.3 µm.

Comparative Example 5

Resin particles were obtained in the same manner as Example 13 with the exception that the amount of MMA was changed to 72 g and ethyleneglycol dimethacrylate (8 g) was used as a crosslinking agent. The resin particles were somewhat distorted spherical particles having average particle diameter of 6.8 µm.

Comparative Example 6

Resin particles were obtained in the same manner as Example 1 with the exception that the amount of MMA was changed to 20 g and the amount of dimethyl polysiloxane was changed to 80 g. The resin particles were distorted spherical particles having average particle diameter of 35 µm.

Example 19

Resin particles were obtained in the same manner as Example 1 with the exception that the amount of magnesium pyrophosphate was changed to 5 g and the amount of sodium lauryl sulfate was changed to 0.04 g.

Each of the resin particles had a shape classified in Type B, and their values of D, d/D and a/b were as follows, respectively.

$D=14.4$ µm $d/D=0.62$ $a/b=0$

Example 20

Resin particles were obtained in the same manner as Example 1 with the exception that the amount of MMA was changed to 50 g and the amount of dimethyl polysiloxane was changed to 50 g.

Each of the resin particles had a shape classified in Type A, and their values of D, d/D and a/b were as follows, respectively.

$D=1.2$ µm $d/D=0.15$ $a/b=0.65$

Example 21

A dispersion medium consisting of magnesium pyrophosphate (5 g) produced by double decomposition as a dispersion stabilizer and water (200 g) was introduced in a separable flask (500 ml), and sodium lauryl sulfate (0.04 g) as a surface active agent was added and dissolved in the medium with stirring.

On the other hand, a monomer composition was prepared by mixing homogeneously styrene (50 g), ethyl perfluorobutyl ether ($C_4F_9OC_2H_5$, viscosity: 0.4 cSt at 25° C., surface tension: 13.6 dynes/cm at 25° C., density: 1.43 g/ml at 25° C., boiling point: 78° C., content of fluorine: 64.8 wt %)(50 g) as a liquid compound and 2,2'-azobis(2,4-dimethyl valeronitrile) as a polymerization initiator (4.0 g), and the resultant monomer composition was added to the above dispersion medium. The mixture was finely dispersed by mixing with a homomixer (ULTRA TURRAX T-25, manufactured by IKA) at 8,000 rpm for about 10 seconds. An agitating element, a thermometer and a reflux condenser were installed in a flask, and the flask was placed in a water bath at 60° C. The air in the flask was sufficiently replaced with nitrogen gas, and polymerization reaction was carried out under heating with stirring at 200 rpm for 20 hours.

After confirming the completion of the polymerization reaction, the reaction mixture was cooled, and the dispersion agent was decomposed by adding hydrochloride to the slurry until pH became about 2. The particles produced were collected by suction filtration using a Buchner funnel equipped with a paper filter, and the particles were washed with deionized water (1.2 litle) to remove the dispersion agent. The cake after washing was dried in an oven under normal pressures at 50° C. for 10 hours to give objective resin particles. The liquid compound could be easily removed by the above drying operation.

The value of D, d/D and a/b of the resin particles were calculated, and the following results were obtained.

$D=15.3$ µm $d/D=0.52$ $a/b=0$

Figure 8:
FIG. 8 is an electron micrograph of the resin particles obtained in Example 21.

Thus obtained resin particles were classified in Type B. The electron micrograph of the resin particles is shown in FIG. 8.

Example 22

Resin particles were obtained in the same manner as Example 21 with the exception that the number of rotations of the homomixer was changed to 25,000 rpm. The values of D, d/D and a/b of these resin particles were calculated and following results were obtained.

$D=3.3$ µm $d/D=0.55$ $a/b=0$

The resin particles obtained in the above were classified in Type B.

Example 23

Resin particles were obtained in the same manner as Example 21 with the exception that the homomixer was not used and the monomer composition was added to the dispersion medium and number of the agitating element in the flask was changed to 50 rpm. The values of D, d/D and a/b of these resin particles were calculated and the following results were obtained.

D=420 μm d/D=0.51 a/b=0

The resin particles obtained in the above were classified in Type B.

Example 24

Resin particles were obtained in the same manner as Example 21 with the exception that the dispersion medium was replaced with a mixture of water (100 g) and 10% dispersion liquid (100 g) of tri-calcium phosphate. The values of D, d/D and a/b of these resin particles were calculated and the following results were obtained.

D=9.2 μm d/D=0.57 a/b=0

The resin particles obtained in the above were classified in Type B.

Example 25

Resin particles were obtained in the same manner as Example 21 with the exception that the amount of styrene was changed to 30 g and the amount of ethyl perfluorobutyl ether was changed to 70 g. The values of D, d/D and a/b of these resin particles were calculated and the following results were obtained.

D=10.3 μm d/D=0.41 a/b=0.86

Figure 9:
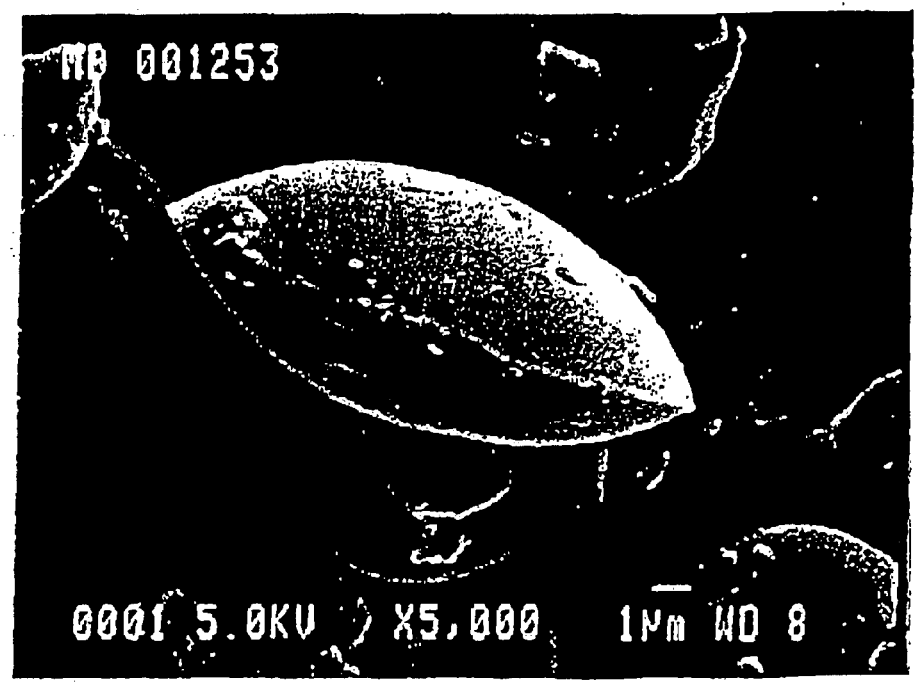
FIG. 9 is an electron micrograph of the resin particles obtained in Example 25.

The resin particles obtained in the above were classified in Type A. The electron micrograph of these resin particles is shown in FIG. 9.

Example 26

Resin particles were obtained in the same manner as Example 21 with the exception that styrene was replaced with trifluoroethyl methaclylate, ethyl perfluorobutyl ether was replaced with perfluorooctane ($C_8F_{18}$, Viscosity: 0.7 cSt at 25° C., surface tension: 15 dynes/cm at 25° C., density: 1.76 g/ml at 25° C., boiling point: 102° C., content of fluorine 78 wt %) and the amount of 2,2'-azobis(2,4-dimethylvaleronitrile) was changed to 0.3 g. The values of D, d/D and a/b of the resin particles were calculated and the following results were obtained.

D=8.3 μm d/D=0.55 a/b=0.80

Figure 10:
FIG. 10 is an electron micrograph of the resin particles obtained in Example 26.

The resin particles obtained in the above were classified in Type C. The electron micrograph of these resin particles is shown in FIG. 10.

Example 27

Resin particles were obtained in the same manner as Example 26 with the exception that the amount of trifluoroethyl methacrylate was changed to 30 g and the amount of perfluorooctane was changed to 70 g. The values of D, d/D and a/b of these resin particles were calculated and following results were obtained.

D=10.3 μm d/D=0.28 a/b=0.83

Figure 11:
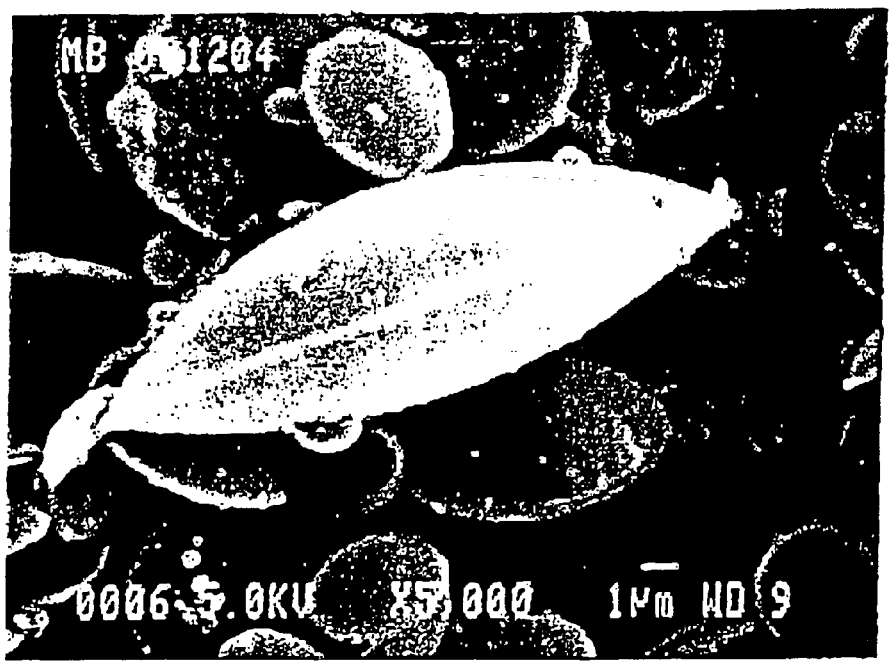
FIG. 11 is an electron micrograph of the resin particles obtained in Example 27.

The resin particles obtained in the above were classified in Type A. The electron micrograph of the resin particles is shown in FIG. 11.

Example 28

Resin particles were obtained in the same manner as Example 26 with the exception that the amount of trifluoroethyl methacrylate was changed to 10 g and the amount of perfluorooctane was changed to 90 g. The values of D, d/D ad a/b of these resin particles were calculated and the following results were obtained.

D=2.5 μm d/D=0.18 a/b=0.75

The resin particles obtained in the above were classified in Type A.

Comparative Example 7

Resin particles were obtained in the same manner as Example 20 with the exception that the amount of styrene was changed to 80 g and the amount of ethyl perfluorobutyl ether was changed to 20 g. The resin particles have average particle diameter of 22.5 μm and have plural cavities.

Comparative Example 8

Resin particles were obtained in the same manner as Example 19 with the exception that ethyl perfluorobutyl ether was replaced with n-hexane having viscosity of 0.65 cSt at 25° C. The resin particles are porous particles having average particle diameter of 28.1 μm.

Comparative Example 9

The procedure of Example 26 was repeated with the exception that the amount of trifluoroethyl methacrylate was changed to 3 g and the amount of perfluorooctane was changed to 97 g, but any resin particle could not be obtained.

Effect of the Invention

According to the present invention, resin particles which have specific shapes and can be suitably used in a wide range of fields such as electronic industry, adhesive, medical treatment, cosmetics and other general industries.

Further, a simple and convenient method for preparing the above resin particles is also provided by this invention. Particularly, by using a hydrophobic fluorinated liquid organic compound, the operation for treating the liquid compound during the preparation of the resin particles, solubility of the liquid compound in the polymerizable vinyl monomer and operation for washing the polymerization apparatus are improved; the liquid compound can be removed by a simple method such as distillation or drying without using troublesome means such as washing with a solvent; as well as the quality of the resin particles can be improved.

What is claimed is:

1. Resin particles each of which has two surfaces composed of two convexly curved surfaces or of one convexly curved surface and one plane surface, has a boundary line between the two surfaces and satisfies the relationships:

$$0.1 \ \mu m \leq D \leq 500 \ \mu m \quad (I)$$

$$0.05 \leq d/D \leq 0.8 \quad (II)$$

wherein the boundary line is recognizable under an electron micrograph and has a width of 1/10 or less of the maximum height of the particle, and wherein D is the particle diameter in horizontal direction and d is the maximum height in longitudinal direction in a side view in which the boundary line is placed in horizontal direction.

2. The resin particles according to claim 1, wherein each particle has two surfaces composed of two convexly curved surfaces.

3. The resin particles according to claim 1, wherein each particle has two surfaces composed of one convexly curved surface and one plane surface.

4. The resin particles according to claim 1 or 2, wherein each particle satisfies the relationships:

$$0.3 \leq d/D \leq 0.8 \quad (III)$$

$$0 < a/b < 0.3 \quad (IV)$$

wherein a and b are each the maximum distance from the boundary line to each surface in a side view in which the boundary line is placed in horizontal direction, provided that $0 < a < b$.

5. The resin particles according to claim 1 or 3, wherein each particle satisfies the relationships:

$$0.3 \leq d/D \leq 0.8 \quad (III)$$

$$a/b = 0 \quad (IV'')$$

wherein a and b are each the maximum distance from the boundary line to each surface in a side view in which the boundary line is placed in horizontal direction, provided that $a = 0$ and $a < b$.

6. The resin particles according to claim 1 or 2, wherein each particle satisfies the relationships:

$$0.1 \leq d/D \leq 0.8 \quad (V)$$

$$0.3 \leq a/b \leq 1.0 \quad (VI)$$

wherein a and b are each the maximum distance from the boundary line to each surface in a side view in which the boundary line is placed in horizontal direction, provided that $0 < a \leq b$.

7. A method for preparing the resin particles according to any one of claims 1 to 3, which comprises preparing the resin particles by suspension polymerization.

8. The method according to claim 7, which further comprises mixing with and dissolving in 100 parts by weight of a polymerizable vinyl monomer, 5 to 200 parts by weight of a hydrophobic liquid compound which does not co-polymerize with the polymerizable vinyl monomer and has a viscosity of 10–1,000,000 cSt at 25° C., and subjecting the mixture to suspension polymerization in the absence of any crosslinking agent, wherein the ratio of the liquid compound and the vinyl monomer affects the value of d/D.

9. The method according to claim 8, wherein the hydrophobic liquid compound is a polysiloxane or a hydrocarbon.

10. The method according to claim 9, wherein the polysiloxane is one or more selected from dimethyl polysiloxane, methyl hydrogen polysiloxane and methyl phenyl polysiloxane.

11. The method according to claim 9, wherein the hydrocarbon is one or more selected from liquid paraffin, polybutene and isobutylene.

12. The method according to claim 8, wherein the hydrophobic liquid compound is removed after the suspension polymerization.

13. The method according to claim 12, wherein the hydrophobic liquid compound is removed by distillation or washing with a solvent in which the hydrophobic liquid compound is dissolved but the resin particles are not dissolved.

14. The method according to claim 7, which further comprises mixing with and dissolving in 100 parts by weight of a polymerizable vinyl monomer, 41–2,000 parts by weight of hydrophobic fluorinated liquid compound which does not co-polymerize with the polymerizable vinyl monomer and has viscosity of 0.1–9 cSt at 25° C., and subjecting the mixture to suspension polymerization in the absence of any crosslinking agent, wherein the ratio of the hydrophobic fluorinated liquid compound and the vinyl monomer affects the value of d/D.

15. The method according to claim 14, wherein the hydrophobic fluorinated liquid compound has a boiling point at 25–200° C. under 1 atmospheric pressure.

16. The method according to claim 15, wherein the hydrophobic fluorinated liquid compound is a saturated hydrocarbon or ether in which the hydrogen atom(s) is (are) partially or wholly substituted with fluorine atom(s) and flurine content is 30–90% by weight.

17. The method according to claim 16, wherein the hydrophobic fluorinated liquid compound is removed by distillation or drying after the suspension polymerization.

18. The method according to claim 17, wherein a slight water-soluble inorganic compound is used as a dispersion stabilizer in the suspension polymerization.

* * * * *